United States Patent [19]

Parsons

[11] 4,373,625
[45] Feb. 15, 1983

[54] DOUBLE-WALLED ROTARY TUBULAR CONVEYOR WITH STABILIZING DRIVE MEANS

[76] Inventor: Ronald S. Parsons, 15 Fieldhedge Dr., Somerville, N.J. 08876

[21] Appl. No.: 192,484

[22] Filed: Sep. 30, 1980

[51] Int. Cl.³ .............................................. B65G 17/00
[52] U.S. Cl. ................................... 198/804; 198/643; 198/819; 417/320
[58] Field of Search ............. 198/607, 626, 643, 804, 198/819, 824, 866, 833; 226/170; 417/320

[56] References Cited

U.S. PATENT DOCUMENTS

| | | | |
|---|---|---|---|
| 3,351,179 | 11/1967 | Thomson | 198/833 |
| 3,773,167 | 11/1973 | McGinnis | 198/835 |
| 3,779,360 | 12/1973 | Taher et al. | 198/835 X |
| 3,869,574 | 3/1975 | Kume | 198/833 |
| 4,174,033 | 11/1979 | Parsons | 198/804 |

Primary Examiner—James B. Marbert
Assistant Examiner—Douglas D. Watts
Attorney, Agent, or Firm—Richard C. Woodbridge

[57] ABSTRACT

A double-walled rotary tubular conveyor includes a stabilizing drive means which prevents the conveyor tube from moving backward, forward or sideways. Two pairs of driven rollers are located in the hollow interior of the conveyor tube. A rubber drive wheel located on the outside of the conveyor tube presses through the tube against the driven rollers. The drive wheel includes a protruding circumferential disc around its middle which is received in the spacing between the four driven rollers through the conveyor material. Two or more synchronized double-walled rotary tubular conveyors can be employed as drive conveyors for a driven tubular conveyor of unlimited length.

7 Claims, 12 Drawing Figures

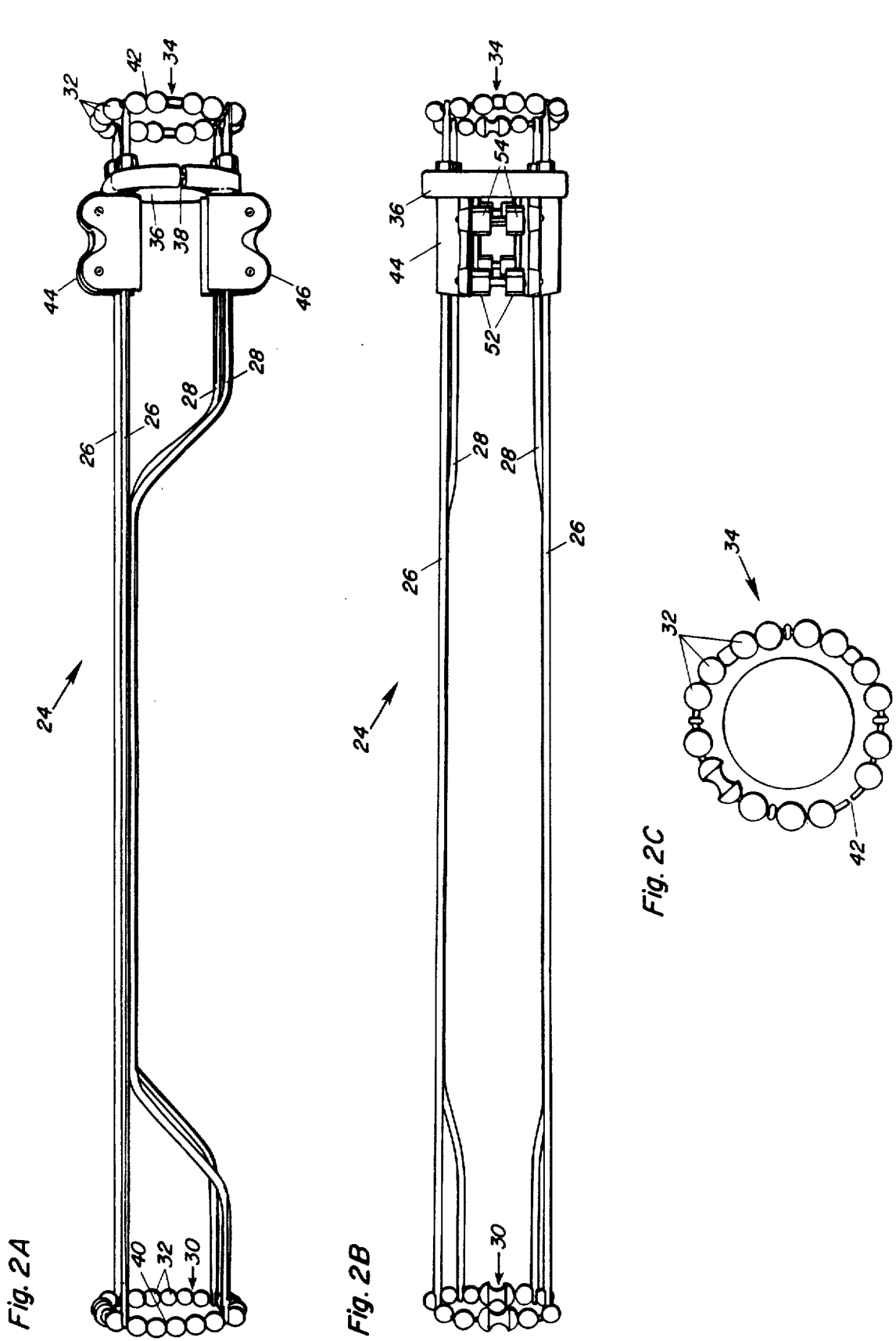

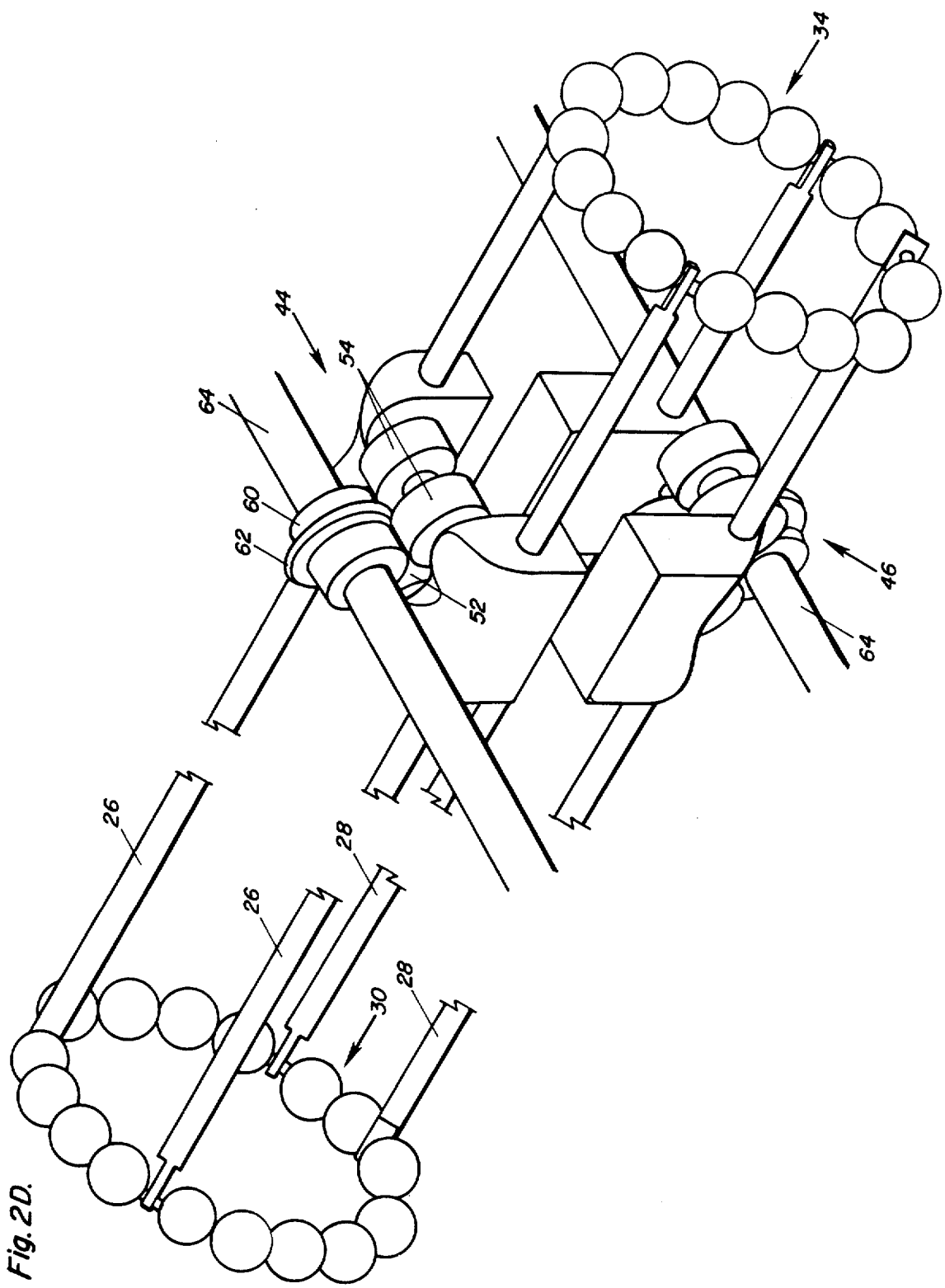

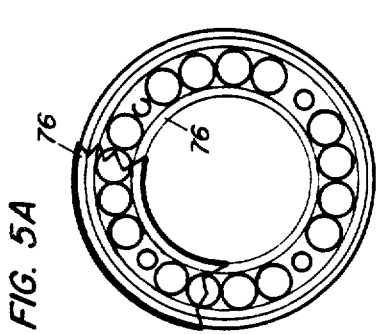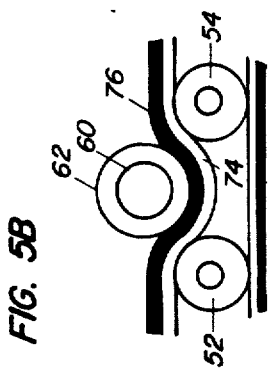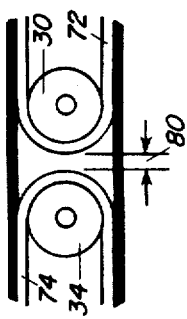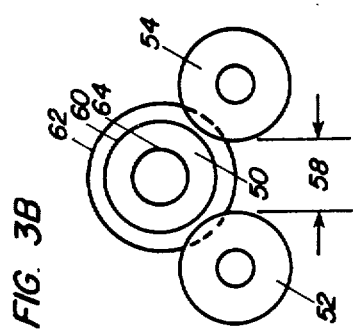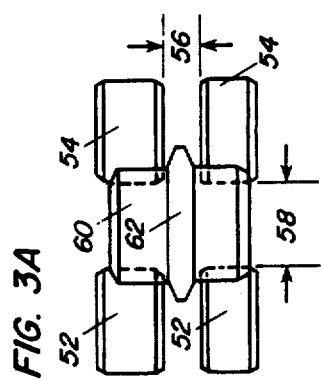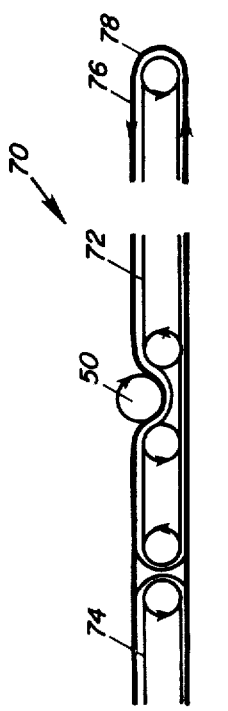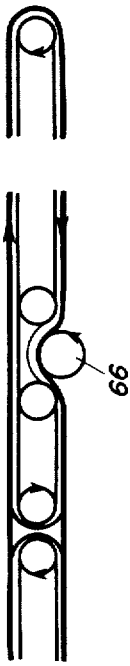

DOUBLE-WALLED ROTARY TUBULAR CONVEYOR WITH STABILIZING DRIVE MEANS

BACKGROUND OF THE INVENTION

1. Field of the Invention

This invention relates to a double-walled rotary tubular conveyor having a stabilizing drive means. A series of such stabilized conveyors can be employed as the drive mechanism for a driven conveyor of unlimited length.

2. Description of the Prior Art

There are currently four basic methods and structures for moving large masses of dry, semi-dry or viscous products from one place to another. These four basic structures are: conveyor belts, bucket loaders or scoop systems, screw feeders and vacuum systems. Each of those systems, however, have drawbacks which make them unsuitable for many applications.

Tubular conveyors are relatively uncommon, however, there is some literature on the subject. Typical tubular or closed belt conveyor approaches are discussed in the following U.S. Pat. Nos. 3,358,812; 3,332,537; 2,839,181; 2,212,024 and 2,108,488.

Each of the above patents disclose a closed tube of circular or rectangular cross-section having a longitudinal seam (i.e. along the direction of motion) which can be open and closed for loading and unloading. While the structures shown in the above patents are workable, the structures are relatively complex and the conveyor belts or tubes must be relatively resilient and the weight of material transported is limited by the relative strength of the tube along the longitudinal slit.

The most relevant prior art appears to be that disclosed in U.S. Pat. No. 4,174,033 issued on Nov. 13, 1979 to Ronald Parsons, the inventor of the present device. That patent discloses a true double-walled rotary tubular conveyor in which a hollow sleeve continuously turns inside out to convey material from one end to another. It describes what is believed to be the first effective attempt to unlock the motion necessary to accomplish a continuous tubular conveyor. There were, however, some short comings in the earlier structure disclosed in U.S. Pat. No. 4,174,033. One problem was that it was difficult to prevent the tube from moving forward or backwards or sideways under the influence of the drive wheels. Another problem was that there was no practical way of extending the conveyor system without placing the conveyor tubes in an abutting relationship. That approach was unacceptable because material tends to fall into or through the gaps between successive conveyors. Additionally, the prior art rotary tubular conveyor disclosed in U.S. Pat. No. 4,174,033 was acceptable for some straight line applications but was not effective for angled applications.

SUMMARY OF THE INVENTION

Briefly described the present invention relates to a double-walled rotary tubular conveyor having an improved stabilizing drive means. The invention consists essentially of the following elements: a flexible sleeve capable of continuously turning inside out; a rigid frame for supporting the sleeve; a drive wheel for driving the conveyor tube; two pairs of driven rollers located inside the hollow interior of the conveyor tube and, a drive motor system for driving the drive wheel. The conveyor tube completely surrounds the frame so that the driven rollers are located in the enclosed hollow interior of the conveyor tube. The two pairs of driven rollers are mounted one in front of the other on the rigid frame. Each driven roller is spaced apart from its mate so as to form a longitudinal gap. Similarly, each roller pair is spaced apart from the other pair so as to form a transverse gap. The drive wheel is preferably made from a rubber-like material and includes in its center section a circumferential disc. In operation, the drive wheel sits in the transverse gap and engages the driven roller pairs through the material of the conveyor tube. Simultaneously, the disc portion of the drive roller sits in the longitudinal gap, but does not contact the driven rollers through the conveyor material. The nestling of the drive roller in the transverse gap tends to prevent the tubular conveyor from moving in a forward or backward direction. Similarly, the positioning of the disc portion of the drive roller in the longitudinal gap tends to stabilize the conveyor tube in the sideways direction.

Given this basic structure it is possible to construct a tubular conveyor having an infinite length. The infinite length conveyor is formed by employing two or more synchronized double-walled rotary tubular conveyors as the drive elements of a single "tube skipping" conveyor which surrounds all of the synchronized conveyor tubes and is driven by them. By using the foregoing construction it is possible to make the conveyor turn corners and to skip from tube to tube without fear of material loss or damage. These and other aspects of the invention will be more fully appreciated with reference to the following drawings and detailed description.

BRIEF DESCRIPTION OF THE DRAWINGS

FIG. 2A is a side perspective view of the rigid support frame for the conveyor tube.

FIG. 2B is a top perspective view of the rigid support frame of FIG. 2A.

FIG. 2C is an end view of the rigid support frame of FIG. 2A.

FIG. 2D is a partial perspective view of the drive mechanism of the invention.

FIG. 3A is a top plan view of the drive wheel and driven rollers.

FIG. 3B is a side elevational view of the drive wheel and the driven rollers of FIG. 3A.

FIG. 4 is a side cross-sectional view of a conveyor of infinite length employing two or more tubular conveyors as drive conveyors for an outer driven conveyor.

FIG. 5A is a partial cross-sectional end view of the conveyor of FIG. 4.

FIG. 5B is a detail of one of the synchronized drive sections of the conveyor illustrated in FIG. 4.

FIG. 5C is a detail view of the area between two drive conveyors on the inside of the driven conveyor illustrated in FIG. 4.

DETAILED DESCRIPTION OF THE INVENTION

During the course of this description, like numbers will be used to identify like elements according to the different views which illustrate the invention.

Figure 1:
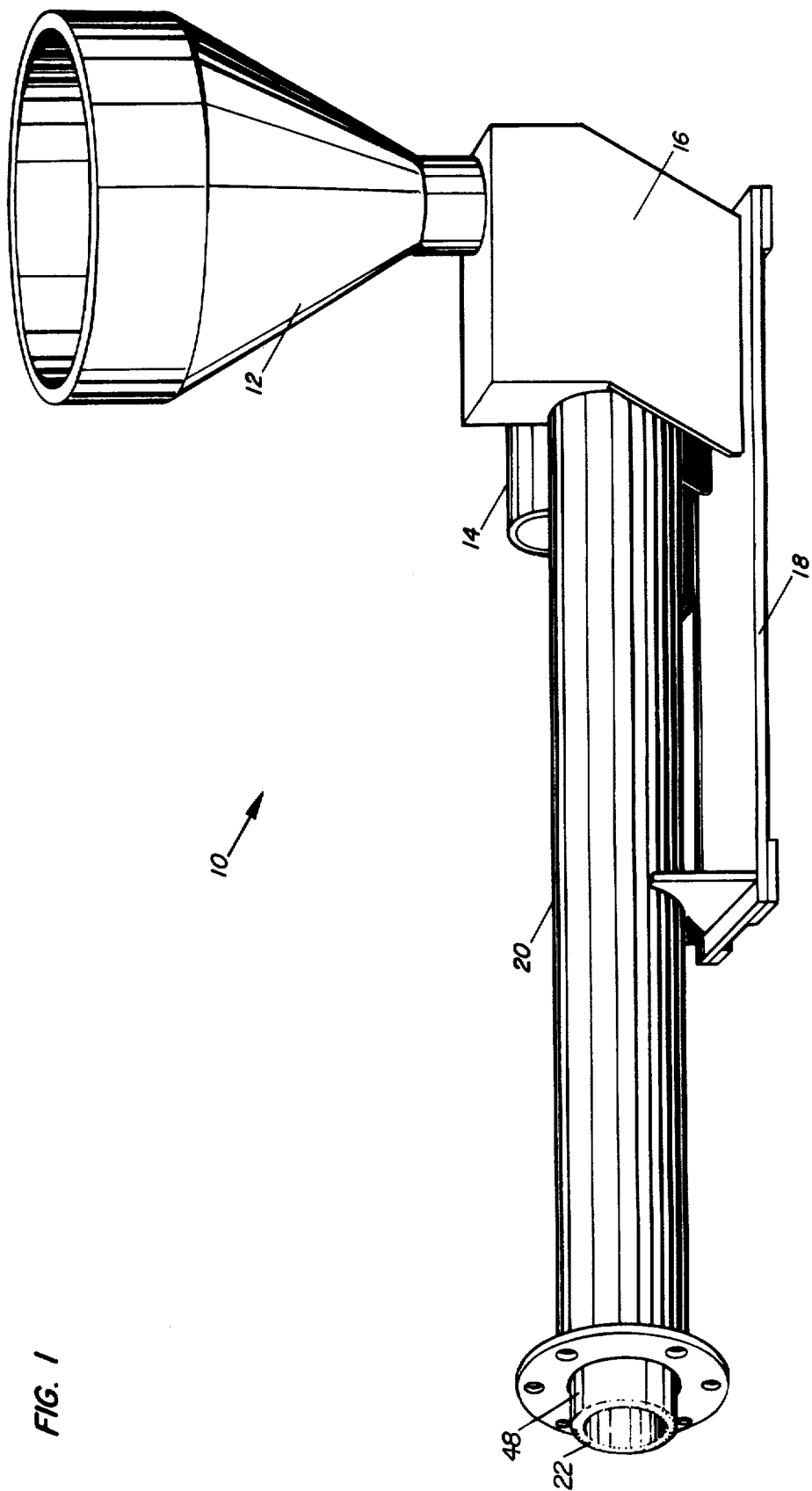
FIG. 1 is a perspective view of a double-walled rotary tubular conveyor according to the preferred embodiment of the invention.

The preferred embodiment 10 of the invention is illustrated in perspective view in FIG. 1. Preferred embodiment 10 is shown to include a feed hopper 12, a drive motor 14, a gear box housing 16, a base 18 for supporting the structure, a protective exterior tube 20 and a flexible conveyor tube 22 visible at one end of protective tube 20. In normal use materials are fed into hopper 12 and conveyed through tube 20 until they exit at the other end of the machine. However, it will be appreciated by those of ordinary skill in the art that materials can be conveyed backwards as well as forwards depending upon the requirements of the system. FIG. 1 merely illustrates the exterior of the preferred embodiment 10. FIGS. 2A-D explain in further detail the teachings of the present invention.

FIGS. 2A-2D and 3A-3B illustrate the relationship between the conveyor tube drive mechanism and the rigid frame 24 which supports tube 22. The rigid conveyor frame support 24 includes the following major elements: a pair of upper support rods 26; a pair of lower support rods 28; exit orifice ring 30; entrance orifice ring 34; circular ridge support 36; upper driven roller set 44 and lower driven roller set 46. Exit orifice ring 30 and entrance orifice ring 34 support a plurality of plastic roller beads 32 which are mounted in such a way as to allow free rotation about their mounting access. Roller beads 32 can be made of Teflon ® or other suitable long-wearing plastic. Circular support bridge 36 is not absolutely required but is useful to help maintain the rigidity of frame 24. Bridge 36 includes a gap 38 which allows the material 48 of conveyor tube 22 to pass through for mounting purposes. Similarly, exit orifice ring 30 and entrance orifice ring 34 include gaps 40 and 42 respectively (which may not be illustrated in the drawings) for allowing the conveyor fabric 48 to be mounted on the frame.

When the double-walled conveyor 10 is properly assembled the fabric 48 of the conveyor tube 22 completely hides the elements illustrated in FIGS. 2A-D and 3A-3B except for the drive wheel 50. Prior to mounting, the conveyor material 48 is sewn in such a way as to form a circular loop having a width of approximately 10" depending upon the ultimate diameter of the tube. The material is slipped onto rigid frame 24 by passing one of the edges of it through gaps 38, 40 and 42 until the conveyor material 48 is completely received on orifice rings 30 and 34. The long longitudinal seam that remains is then sewn up along its entire length. The material 48 just mounted can be easily moved so that as the fabric exits from orifice 30 it simultaneously enters through orifice 34. Roller beads 32 allow this unique motion with a minimum of drag. Accordingly, the material 48 is capable of continuously turning itself inside out and may be propelled in either a forward or reverse direction according to the requirements of the ultimate system.

Upper driven roller set 44 and lower driven roller set 46 each include a pair of front driven rollers 52 and a pair of rear driven rollers 54. Front rollers 52 are coaxial with each other and separated by a longitudinal gap 56. Rear driven rollers 54 are separated from the front driven rollers 52 by a transverse gap 58. Additionally, rear driven rollers 54 are separated from each other by a longitudinal gap 56 which is the same in dimension as the longitudinal gap 56 between the front driven rollers 52. The gaps 56 between roller pairs 52 and 54 are aligned longitudinally in the direction of motion of the conveyor tube 22. Transverse gap 58 is defined as being perpendicular to the motion of conveyor tube 22.

Drive wheel 50 includes a rubber body portion 60 and a circumferential metal disc 62 located midway between the ends of body portion 60. Disc 62 has a diameter greater than the body portion 60, but a width less than that of longitudinal gap 56. Drive wheel 50 is driven by drive shaft 64 which is connected through a conventional reduction gear system (not illustrated) to drive motor 14. In a similar manner drive motor 14 rotates a synchronized lower drive wheel 66 which is mechanically associated with the lower driven roller set 46. Upper and lower roller sets 44 and 46 and upper and lower drive wheels 50 and 66 are located 180° apart and serve to balance the drive of the device. It is possible, though not preferable, to drive the conveyor tube 22 with one drive wheel or, under other circumstances, it is possible, though not preferable, to drive the conveyor tube 22 with more than two drive wheels per tube.

In operation the frame 24 is covered with material 48 in the manner previously described. Driven roller sets 44 and 46 are located in the hollow closed interior 68 of conveyor tube 22 and are never visible to the operator unless the apparatus 10 is disassembled. Drive wheel 50 drives material 48 by pinching it against driven rollers 52 and 54. Disc 62 fits in longitudinal gap 56 but does not press material 48 against the sides of driven rollers 52 and 54. Disc 62 serves the purpose of preventing the material 48 from slipping sideways in a direction transverse to the travel of tube material 48. In a similar manner drive wheel 50 is cradled in transverse gap 58 in such a way as to prevent the tube frame 24 from escaping by moving forward or backwards. Therefore, the drive mechanism just described tends to stabilize the conveyor tube 22 by minimizing the tendency of the apparatus to move forward, backward or sideways. Metal disc 62 preferably keeps the tube fabric 48 under tension, but not so tightly as to sheer or tear the fabric 48 during use. A small amount of sideways wander can be desirable so that the tube 22 does not wear at the same locations at all times. However, the amount of sideways wander has to be strictly controlled so that the tube 22 operates in an efficient manner. The driving relationship of upper drive wheel 50 to the upper driven roller set 44 is identical to the driving relationship between the lower drive wheel 66 and the lower driven roller set 46.

If conveyors are constructed with stabilized drives in the manner previously described it is possible to link them together with a "tube skipping" driven conveyor to produce a quadruple-walled rotary tubular conveyor 70 of infinite length as illustrated in FIGS. 4 and 5A-5C. Conveyor 70 comprises at least a first and second internal drive conveyor 72 and 74 and an external "tube skipping" driven conveyor 76. While only two internal drive conveyors 72 and 74 have been illustrated it will be appreciated by those of ordinary skill in the art that 3, 4, 5, etc. or an infinite number of internal drive conveyors could be employed. Each of the internal drive conveyors 72 and 74 are essentially identical to the double-walled rotary tubular conveyor 10 illustrated in FIGS. 1 through 3B. The outer "tube skipping" driven conveyor 76 completely surrounds the frames 24 of drive conveyors 72 and 74 including their driven roller sets 44 and 46 and the double-walled conveyor tubes 22. The only difference is that the upper and lower drive wheels 50 and 66 do not impinge directly upon the material 48 of the flexible conveyor tube 22 but rather transmit their force through the material 78 of the exterior "tube skipping" driven conveyor 76. Upper and lower drive wheels 50 and 66 are all synchronized so that undesirable tensions are not imposed upon the material 78 of driven conveyor 76. Details of the drive system can be appreciated by referring to FIG. 5B.

The gap 80 between adjacent drive conveyors 72 and 74 is illustrated in detail in FIG. 5C. One major advantage of the tube skipping embodiment of FIG. 4 is that materials conveyed from one drive section 72 to another drive section 74 are not caught in the intervening gap 80. It will also be appreciated that as the load carried by conveyor 70 moves from one drive section 72 to another drive section 74 that it (the load) is essentially only "seen" by the drive section 72 or 74 through which it is passing. It might be possible to construct a very long conveyor having only a single double-walled tube and no internal drive conveyors such as 72 and 74. However, such a system introduces tremendous tensions upon the fabric 78 of the conveyor and those tensions can lead to rips and premature wear. The present invention 70 employing interior double-walled conveyors to convey an outer exterior conveyor 76 can be extended indefinitely. Its limits are only the number of interior conveyors 72, 74, etc. that are available for use. It will also be appreciated that the "tube skipping" embodiment just described can be employed to convey materials in a forward as well as a reverse direction.

Figure 6:
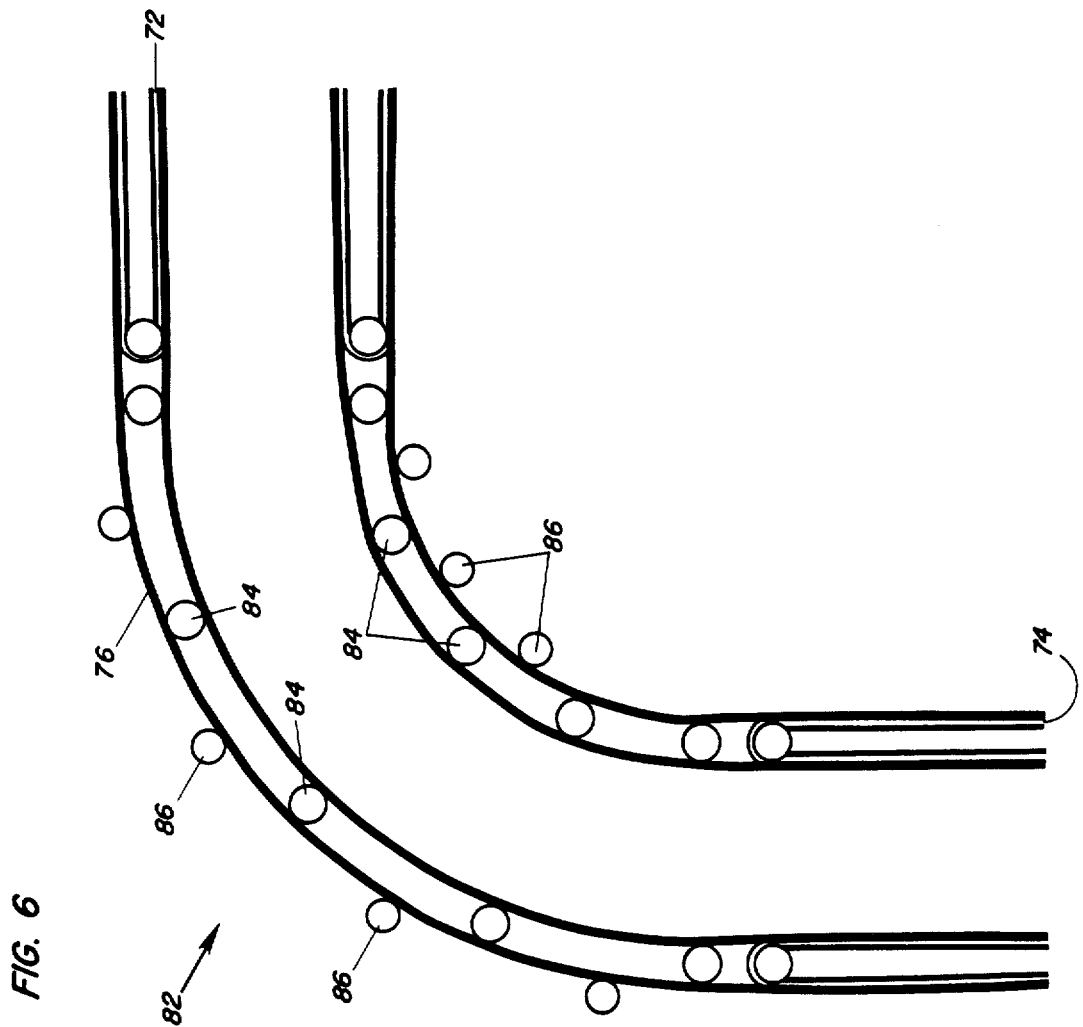
FIG. 6 is a cross-sectional view of a conveyor section including a 90° elbow.

FIG. 6 illustrates an elbow embodiment 82 in which the drive conveyors 72 and 74 have axis that are at 90° with respect to each other. The choice of 90° is only for illustrative purposes and it will be appreciated by those of ordinary skill in the art that almost any other angle orientation can be achieved. The elbow embodiment 82 could be easily thought of as an extension of the "tube skipping" embodiment illustrated in FIGS. 4 and 5A-5C in which the gap 80 between adjacent conveyors 72 and 74 is stretched and turned to the appropriate orientation. Additional supporting structures 84 and 86 are employed to maintain the shape of the driven tube 76. The interior frame 84 comprises a plurality of roller beads 32 and is similar to the structure discussed with regard to orifice rings 30 and 34. Similarly the exterior structure of elbow 82 is maintained through the use of outer frame 86 which incorporates roller beads 32 to achieve the same result.

The material 48 and 78 of the conveyor tubes is preferably a canvas-like material having long life. There are a wide variety of fabric materials impregnated by plastics or rubbers which are also suitable. Moreover, there are believed to be some non-fabric plastic materials that would be suitable as well.

Drive wheels 50 and 66 have been described as having rubber bodies 60 and a circumferential disc portion 62. Plastic materials other than rubber can be employed as well and are known to those of ordinary skill in the art. For example, the body 60 and circumferential disc portion 62 of drive wheels 50 and 66 could be made of knurled metal, plastic, steel or other suitable materials. Driven rollers 52 and 54 are preferably metallic, but Nylon ® or Teflon ® can also be employed. Similarly, roller beads 32 can be made of Nylon ®, Teflon ® or other suitable materials. Circular bridge 36 and the support for upper and lower driven roller sets 44 and 46 are preferably made from known plastic materials. Two support rings 30 and 34 are illustrated at the exit and entrance of the preferred embodiment of the invention. If the conveyor is fairly long it may be desirable to have more than two support rings similar to support rings 30 and 34 in order to maintain the structural integrity of the tubular conveyor. Additional support rings would be suitable in the context of a single conveyor unit such as illustrated in FIGS. 1 through 3B or in the tube skipping embodiment of FIGS. 4 through 6 depending upon the structural needs of the conveyor. Support rods 26 and 28 preferably comprise steel material and may, if desired, be covered with suitable finishes. As previously described, the device preferably includes two drive wheels 50 and 66, under some circumstance one drive wheel might be employed, or, under other circumstances, more than two drive wheels might be required. Tubes 72 and 74 of the quadruple-walled infinite length conveyor 70 could be formed of polyurethane or fiberglass materials. The tube material for drive tube 72 and 74 should be non-elastic lengthwise, but elastic sideways (i.e. perpendicular to the direction of travel of the conveyor) so as to expand and contract with the inside diameter and outside diameter of exit and entrance support rings 30 and 34 respectively. As shown in FIGS. 2B and 2C the exit and entrance rings 30 and 34 respectively include at least one roller bead 32 having an hourglass shape that defines a notch in the body of the bead 32. The notch is useful because it can be used to help stabilize a series of drive conveyors 72 and 74 in the context of the tube skipping embodiment. In that environment a rod or other guide might be used to prevent the tubes 72 and 74 from drifting clockwise or counter clockwise relative to each other and the outer skipping tube 76.

While the invention has been described with respect to the preferred embodiment thereof, it will be appreciated by those of ordinary skill in the art that changes can be made to the structure and materials used without departing from the spirit and scope of the invention.

I claim:

1. A double-walled rotary tubular conveyor apparatus comprising:

a flexible first tubular member having an inside surface, an outside surface, and first and second end portions, said first tubular member including a hollow interior between said inside and said outside surfaces and further including an inlet and an outlet orifice located respectively at the locations of said first and said second end portions;

a first rigid support means located within the hollow interior of said first tubular member for maintaining the rigidity and shape of said first tubular member;

a first drive means for contacting and driving said first tubular member, said first drive means comprising a drive wheel including a body portion and a circumferential disc portion located on and surrounding said body portion; and, a first driven means located in said hollow interior for being driven by said first drive means through said first tubular means, said first driven means including a cavity means therein for receiving said first drive means, said first driven means further comprising at least a first and a second wheel separated by a first longitudinal gap from each other in a coaxial and parallel manner, said first driven means also including third and fourth wheels which are coaxial and parallel with respect to each other and removed from said first and said second wheels by a transverse gap, said third and fourth wheels being respectively co-planar with said first and second wheels, said third and fourth wheels having a second longitudinal gap therebetween, said first and second longitudinal gaps being so aligned as to form an extended gap, wherein said disc portion of said first drive means is receivable in said extended longitudinal gap and said body portion is receivable in said transverse gap.

2. A double-walled rotary tubular conveyor apparatus comprising:

a first flexible tubular member having an inside surface, an outside surface, and first and second end portions, said first tubular member including a hollow interior between said inside and said outside surfaces and further including an inlet and an outlet orifice located respectively at the location of said first and second end portions;

a first rigid support means located within the hollow interior of said first tubular member for maintaining the rigidity and shape of said first tubular member;

a second flexible tubular member having an inside surface, an outside surface, and first and second end portions, said second tubular member including a hollow interior between said inside and said outside surfaces and further including an inlet and an outlet orifice located respectively at the location of said first and second end portions;

a second rigid support means located within said hollow interior of said second tubular member for maintaining the rigidity and shape of said second tubular member;

a third tubular member having an inside surface, an outside surface, and first and second end portions, said third tubular member including a hollow interior between said inside and said outside surfaces and further including an inlet and an outlet orifice located respectively at the location of said first and second end portions, said first and second tubular members being located within the hollow interior of said third tubular member;

at least a first drive means for contacting the outer surface of said third tubular member; and, at least a first driven means located in said hollow interior of said first tubular member for engaging said first drive means through said first and third tubular members, said first driven means also including a cavity means therein for receiving said first drive means.

3. The apparatus of claim 2 further including:

at least a second drive means for contacting the outer surface of said third tubular member; and, at least a second driven means located in said hollow interior of said second tubular member for engaging said second drive means through said third tubular member and said second tubular member, said second driven means also including a cavity means therein for receiving said second drive means.

4. The apparatus of claim 3 wherein said first and second tubular members are separated by a gap and said first and second tubular members are angled with respect to each other so as to form a bend of said third tubular member in the region of said gap.

5. A tubular conveyor apparatus comprising:

a first double-walled rotary tubular conveyor;

at least a second double-walled rotary tubular conveyor;

a tube skipping conveyor having an inside surface, an outside surface, and first and second end portions, said tube skipping conveyor including a hollow interior between said inside and said outside surfaces and further including an inlet and an outlet orifice located respectively at the location of said first and second end portions, said first and second double-walled rotary tubular conveyors being located inside the hollow interior of said tube skipping conveyor;

at least one drive means for contacting the outer surface of said tube skipping conveyor; and, at least one driven means for engaging said drive means, said driven means being located in the interior of at least one of said rotary tubular conveyors, wherein power to drive said apparatus is transmitted from said drive means through said tube skipping conveyor and at least one of said double-walled tubular conveyors to said driven means.

6. A double-walled rotary tubular conveyor apparatus comprising:

a flexible tubular member having an inside surface, an outside surface, and first and second end portions, said first tubular member including a hollow interior between said inside and outside surfaces and further including an inlet and an outlet orifice located respectively at the location of said first and second end portions;

a rigid support means located within the hollow interior of said tubular member for retaining the rigidity and shape of said tubular member;

at least one drive means for contacting and driving the outer surface of said first tubular member, said drive means comprising a drive wheel including a body portion and a circumferential disc portion located on and surrounding said body portion; and, a driven means located in said hollow interior for engaging said first drive means through said first tubular member, said driven means comprising two pairs of wheels, each of said pairs having a gap between them for receiving said disc portion, said body portion of said drive means frictionally engaging said first and said second pair of wheels through said tubular member, wherein the engagement of said driven means by said drive means stabilizes the movement of said tubular member in directions perpendicular and transverse to the direction of conveying of said tubular apparatus.

7. A tubular conveyor apparatus comprising:

a first double-walled rotary tubular driven conveyor including at least a first drive means therefor, said first conveyor having a continuously circular cross-section;

at least a second double-walled rotary tubular driven conveyor including at least a second drive means therefore synchronized with said first drive means, said second conveyor having a continuously circular cross-section;

and, a tube skipping conveyor completely surrounding said first and second double-walled rotary tubular conveyors, said tube skipping conveyor having a continuously circular cross-section.

* * * * *